(12) United States Patent
Park et al.

(10) Patent No.: US 7,287,302 B2
(45) Date of Patent: Oct. 30, 2007

(54) SWING HINGE DEVICE OF PORTABLE TERMINAL

(75) Inventors: Sung-Sun Park, Gumi-si (KR); Jong-Gun Bae, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/048,919

(22) Filed: Feb. 3, 2005

(65) Prior Publication Data

US 2005/0202687 A1     Sep. 15, 2005

(30) Foreign Application Priority Data

Mar. 12, 2004   (KR) .................... 10-2004-0016834

(51) Int. Cl.
*E05D 11/10* (2006.01)
(52) U.S. Cl. ................... 16/330; 16/303; 16/341; 16/241
(58) Field of Classification Search ............... 16/239, 16/241, 255, 284, 303, 304, 312, 333, 341–343, 16/356, 376, 330; 455/550, 556, 90, 575; 379/433.13, 434, 433, 428; 361/681–683, 361/803; 403/118–120
See application file for complete search history.

(56) References Cited

U.S. PATENT DOCUMENTS

| | | | | |
|---|---|---|---|---|
| 6,085,387 A * | 7/2000 | Han | ............................ | 16/330 |
| 6,530,121 B2 * | 3/2003 | Hayashi | ....................... | 16/330 |
| 6,742,221 B2 * | 6/2004 | Lu et al. | ....................... | 16/367 |
| 6,950,686 B2 * | 9/2005 | Won | ......................... | 455/575.3 |
| 7,100,244 B2 * | 9/2006 | Qin et al. | ...................... | 16/330 |
| 2004/0198474 A1 * | 10/2004 | Jung et al. | ................ | 455/575.1 |
| 2004/0200038 A1 * | 10/2004 | Kim | .............................. | 16/367 |
| 2004/0224730 A1 * | 11/2004 | Sakai et al. | .............. | 455/575.3 |
| 2005/0066474 A1 * | 3/2005 | Hsu et al. | ....................... | 16/330 |
| 2005/0091795 A1 * | 5/2005 | Jeong et al. | ................... | 16/303 |
| 2005/0094360 A1 * | 5/2005 | Lee et al. | ..................... | 361/679 |
| 2005/0119023 A1 * | 6/2005 | Sudo et al. | .............. | 455/550.1 |
| 2005/0137001 A1 * | 6/2005 | Bell et al. | ................. | 455/575.4 |
| 2005/0150081 A1 * | 7/2005 | Gan | ............................ | 16/367 |
| 2005/0160558 A1 * | 7/2005 | Kim | ............................. | 16/367 |
| 2005/0202856 A1 * | 9/2005 | Park et al. | ................ | 455/575.1 |

(Continued)

*Primary Examiner*—William L. Miller
(74) *Attorney, Agent, or Firm*—Roylance, Abrams, Berdo & Goodman, L.L.P.

(57) ABSTRACT

A swing hinge device of a portable terminal is adapted to semi-automatically rotate a pair of housings of the terminal while they face each other to open and close them. The swing hinge device of a portable terminal having a first housing and a second housing includes a hinge housing extending along a longitudinal direction and having a reception space formed therein. A hinge shaft is rotatably coupled to the hinge housing and has a number of crests formed thereon. A hinge cam is positioned in the reception space of the hinge housing and is adapted to linearly travel therein along the longitudinal direction of the hinge axis and has a number of troughs formed thereon that face the respective crests. A hinge spring is positioned between the hinge housing and the hinge cam to provide an elastic force so that the hinge cam may linearly travel while forcing it against the hinge shaft. A hinge stopper portion is positioned between the hinge housing and the hinge shaft to limit the range of rotation of the hinge shaft that rotates in the hinge housing.

19 Claims, 14 Drawing Sheets

U.S. PATENT DOCUMENTS

2005/0221874 A1* 10/2005 Cho et al. ................ 455/575.4
2005/0245294 A1* 11/2005 Gupte et al. ............. 455/575.1
2006/0230579 A1* 10/2006 Ko et al. ..................... 16/330

* cited by examiner

SWING HINGE DEVICE OF PORTABLE TERMINAL

CROSS REFERENCE TO RELATED APPLICATION

This application claims the benefit under 35 U.S.C. § 119(a) of an application entitled "Swing Hinge Device of Portable Terminal" filed with the Korean Intellectual Property Office on Mar. 12, 2004 and assigned Ser. No. 2004-16834, the entire contents of which are hereby incorporated by reference.

BACKGROUND OF THE INVENTION

1. Field of the Invention

The present invention relates to a swing hinge device of a portable terminal. More particularly, the present invention relates to a swing hinge device of a portable terminal adapted to semi-automatically rotate a pair of housings of the terminal while they face each other to open and close them.

2. Description of the Related Art

In general, a "portable communication apparatus" refers to an apparatus that a user can carry with him to perform wireless communication with a desired partner. Portable communication apparatuses include HHPs, CT-2 cellular phones, digital phones, PCS phones, and PDAs, and may be classified into various categories according to their appearance. For example, portable terminals may be classified into bar-type portable terminals, flip-type portable terminals, and folder-type portable terminals according to the appearance of the particular apparatus. The bar-type portable terminals have a single housing shaped like a bar. The flip-type portable terminals have a flip or a cover that is rotatably coupled to a bar-shaped housing by a hinge device. The folder-type portable terminals have a folder that is connected to a single bar-shaped housing by a hinge device in such a manner that the folder can be rotated to fold on or unfold from the housing.

Conventional portable terminals, as enumerated above, are necessarily equipped with an antenna device, a data input and output device, and a data transmission and reception device. The data input device is usually made up of a keypad that is used to input data through finger pressing operation, and a touch pad or touch screen may also be used.

In addition, an LCD is generally used for the display function of the data output device.

Flip-type or folder-type terminals have now prevailed because they have excellent sound receptivity and are beneficial to making the body in a compact size with reduced weight.

In order to meet the diversified tastes of consumers, sliding-type and swing-type terminals have recently appeared that implement opening and closing operation while a pair of housings face each other. Furthermore, terminals have been developed that implement the opening and closing operation of folder-type terminals in combination with that of swing-type terminals.

However, practical means to implement the opening and closing operation of conventional portable terminals has not been provided. In particular, swing-type terminals that implement opening and closing operation by rotating a pair of housings while they face each other have a problem in that, in order to open the terminals for speech, the user must manually rotate one housing to a speech position.

In addition, when one housing is continually rotated in one direction, an FPCB positioned between the pair of housings may be damaged.

SUMMARY OF THE INVENTION

Accordingly, the present invention has been made to solve the above-mentioned problems occurring in the prior art. An object of the present invention is to provide a swing hinge device of a portable terminal adapted to semi-automatically rotate a pair of housings of the terminal while they face each other to open and close them for easy opening and closing operation of the terminal.

Another object of the present invention is to provide a swing hinge device of a portable terminal having a hinge stopper positioned between a pair of housings of the terminal, which face each other, to limit the range of rotation of the terminal and avoid any damage to an FPCB.

Still another object of the present invention is to provide a swing hinge device of a portable terminal having a hinge module slanted at a predetermined angle relative to a pair of housings of the terminal, which face each other, for more improved opening and closing operation of the terminal.

A swing hinge device of a portable terminal has a first housing, and a second housing coupled to the first housing and adapted to rotate about a hinge axis that extends perpendicularly to the upper surface of the first housing while facing the surface. The swing hinge device includes a hinge housing extending along a longitudinal direction and a reception space formed therein. A hinge shaft is rotatably coupled to the hinge housing and has a number of crests formed thereon. A hinge cam is positioned in the reception space of the hinge housing and is adapted to linearly travel therein along the longitudinal direction of the hinge housing and has a number of troughs formed thereon that face the respective crests. A hinge spring is positioned between the hinge housing and the hinge cam to provide an elastic force so that the hinge cam may linearly travel while forcing it against the hinge shaft. A hinge stopper portion is positioned between the hinge housing and the hinge shaft to limit the range of rotation of the hinge shaft that rotates in the hinge housing.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numbers will be understood to refer to like parts, components and structures.

DETAILED DESCRIPTION OF EXEMPLARY EMBODIMENTS

Figure 1:
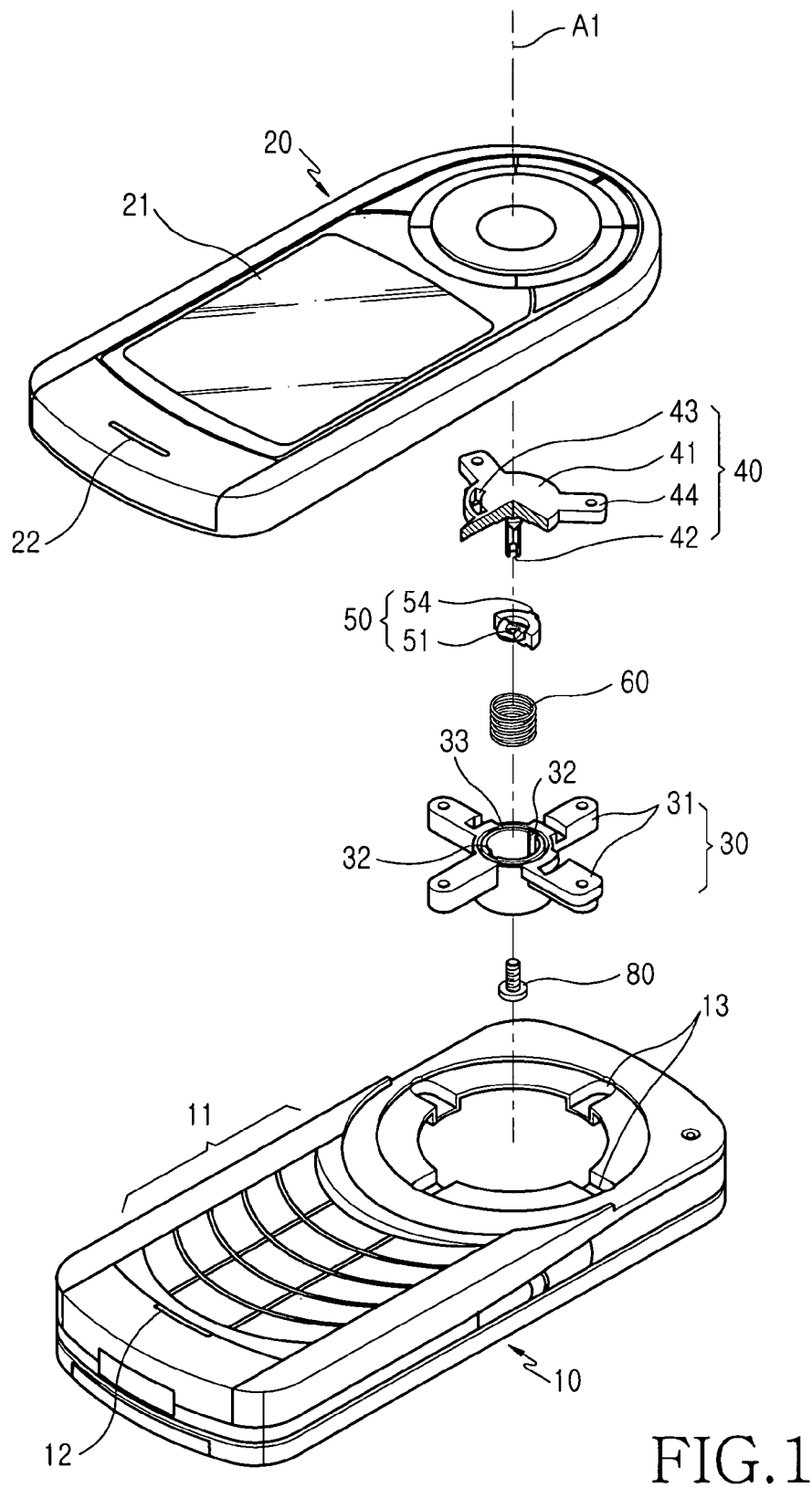
FIG. 1 is an exploded perspective view of the construction of a swing hinge device of a portable terminal according to an embodiment of the present invention.

Hereinafter, exemplary embodiments of the present invention will be described with reference to the accompanying drawings. In the following description of the present invention, a detailed description of known functions and configurations incorporated herein will be omitted when it may make the subject matter of the present invention unclear.

As shown in FIGS. 1 to 13, a portable terminal is provided with a first housing 10 having a number of keypads 11 and a microphone device 12.

A second housing 20 is coupled to the first housing 10 and is adapted to rotate about a hinge axis A1, which extends perpendicularly to the upper surface of the first housing 10, while facing the upper surface thereof.

The second housing 20 is provided with a display device 21 for a display function and a speaker device 22.

A swing hinge device of the portable terminal includes a hinge housing 30, a hinge shaft 40, a hinge cam 50, a hinge spring 60, and a hinge stopper portion 70.

The hinge housing 30 extends along the longitudinal direction of the hinge axis A1 and is fixedly fastened to the first housing 10. The hinge housing 30 has a reception space formed therein to receive the hinge shaft 40, the hinge cam 50, and the hinge shaft 60 in a series.

The hinge shaft 40 is provided with first and second crests 45 and 46, which face first and second troughs (described later) of the hinge cam 50, and is rotatably coupled to the hinge housing 30.

The hinge cam 50 is provided with first and second troughs 52 and 53, which face the first and second crests 45 and 46, and is positioned in the reception space to linearly travel along the longitudinal direction of the housing 30 in the reception space.

The hinge spring 60 is positioned between the hinge housing 30 and the hinge cam 50 to provide an elastic force necessary for the linear movement of the hinge cam 50 while forcing it against the hinge shaft 40.

The hinge stopper portion 70 is positioned between the hinge housing 30 and the hinge shaft 40 to limit the range of rotation of the hinge shaft 40, which rotates in the hinge housing 30.

The hinge housing 30 and the hinge shaft 40 are slanted at a predetermined angle relative to the first and second housings 10 and 20 so that the second housing 20 may easily rotate from the first housing 10.

The hinge housing 30 includes a number of housing-side fastening pieces 31, a pair of guide grooves 32, a circuit connection groove 33, and a screw coupling portion 34.

The housing-side fastening pieces 31 extend from the outer circumference of the hinge housing 30 to be coupled and screw-fastened to a number of insertion grooves 13 formed on the first housing 10.

Figure 2:
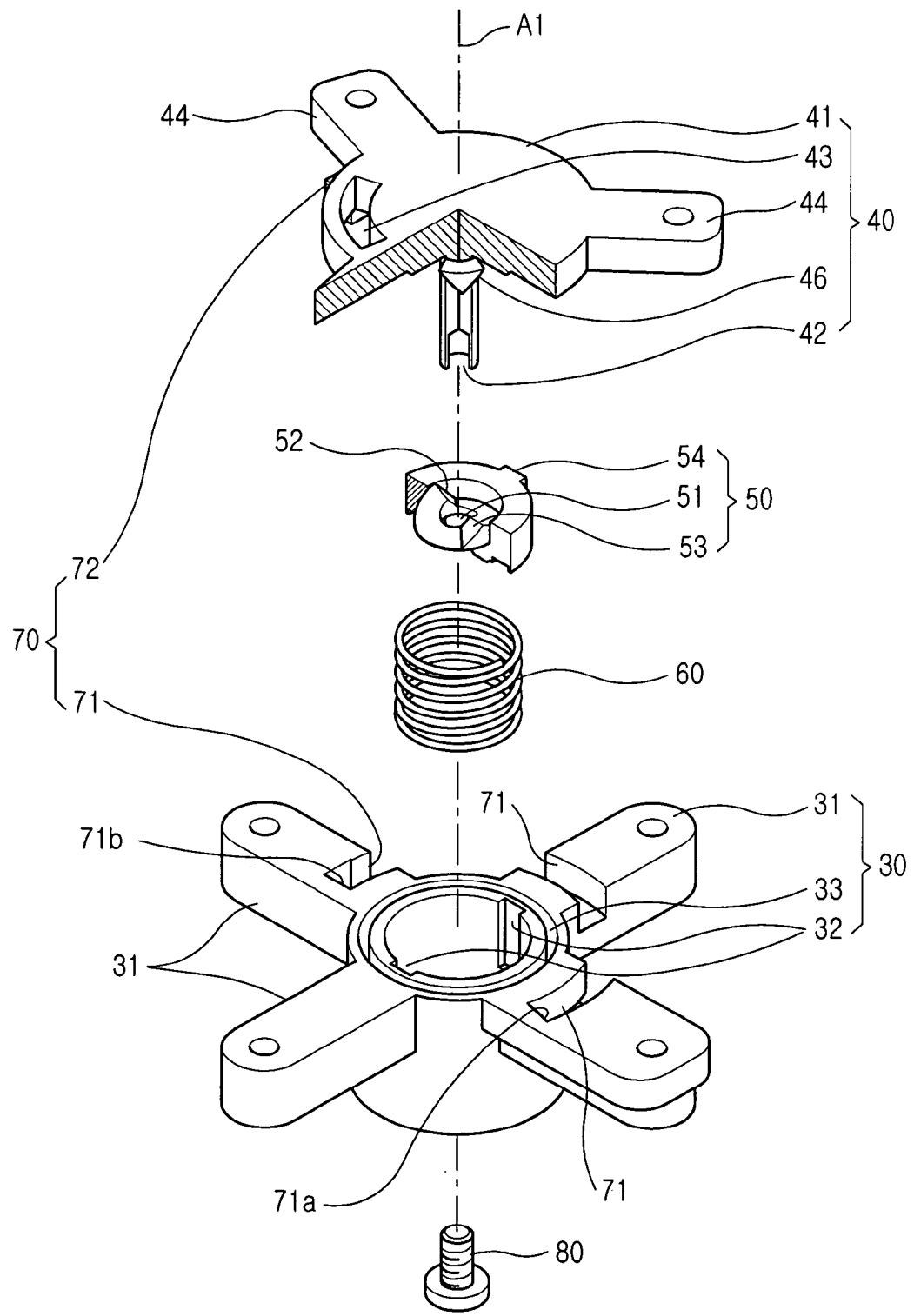
FIG. 2 is a magnified exploded perspective view of the construction of a swing hinge device of a portable terminal according to an embodiment of the present invention.

Each housing-side fastening piece 31 is positioned with substantially equal angular spacing about the hinge axis A1 of the hinge housing 30, such as in a cross configuration (FIG. 2).

The pair of guide grooves 32 are formed on the inner wall surface of the hinge housing 30 and are adapted to receive a guide protrusion 54 formed on the hinge cam 50 for guidance.

The circuit connection groove 33 is formed between the housing-side fastening piece 31 and the guide groove 32 so that a flexible circuit (not shown), which extends through a through-hole 43 formed on the hinge shaft 40, may be connected to the first housing 10 through the circuit connection groove 33.

The screw coupling portion 34 is formed on the inner central portion of the hinge housing 30 to be coupled and screw-fastened to an end of the hinge shaft 40.

The screw coupling portion 34 has a housing-side screw hole 34a formed on the central portion thereof, which corresponds to a screw groove 42 of the hinge shaft 40.

The hinge shaft 40 has a disk-shaped plate 41 formed on an end thereof and is adapted to rotate in the hinge housing 30.

The hinge shaft 40 has a shaft-side screw groove 42 formed in the other end thereof, which corresponds to the housing-side screw hole 34a of the hinge housing 30, to receive a screw 80 to be fastened in the corresponding hole.

The disk-shaped plate 41 has a through-hole 43 formed therein that extends a predetermined length along the circumference thereof so that the flexible circuit (not shown) may pass through.

The disk-shaped plate 41 has a number of shaft-side fastening pieces 44 extending from the outer circumference thereof to be fastened to the second housing 20. in any suitable manner, such as by screws.

The shaft-side fastening pieces 44 are arranged about the hinge axis A1 of the hinge shaft 40 with substantially equal angular spacing therebetween, such that obtuse angles are formed resulting in a triangular configuration.

The hinge shaft 40 has first and second crests 45 and 46 formed on the outer peripheral surface thereof adjacently to each other, which are positioned along the circumference thereof in such a manner that they may rotate while facing the first and second troughs 52 and 53 formed on the hinge cam 50.

The first and second crests 45 and 46 are symmetrically positioned about the hinge axis A1 of the hinge housing 30 while facing each other.

The hinge cam 50 includes cam-side through-holes 51 and 43, first and second troughs 52 and 53, and a guide protrusion 54.

The cam-side through-holes 51 and 43 are positioned at the central portion of the hinge cam 50 so that the hinge shaft 40 extends therethrough to be coupled thereto.

The first and second troughs 52 and 53 are positioned along the outer periphery of the cam-side through-holes 51 and 43 in such a manner that they face the first and second crests 45 and 46 and semi-automatically rotate the hinge shaft 40 according to rotation.

The guide protrusion 54 extends from the outer peripheral surface of the hinge cam 50 to guide the hinge cam 50 in such a manner that, as it is coupled to the guide groove 32 of the hinge housing 30, it linearly travels toward the hinge shaft 40 along the guide groove 32.

The first and second troughs 52 and 53 are formed having a predetermined depth.

Figure 10:
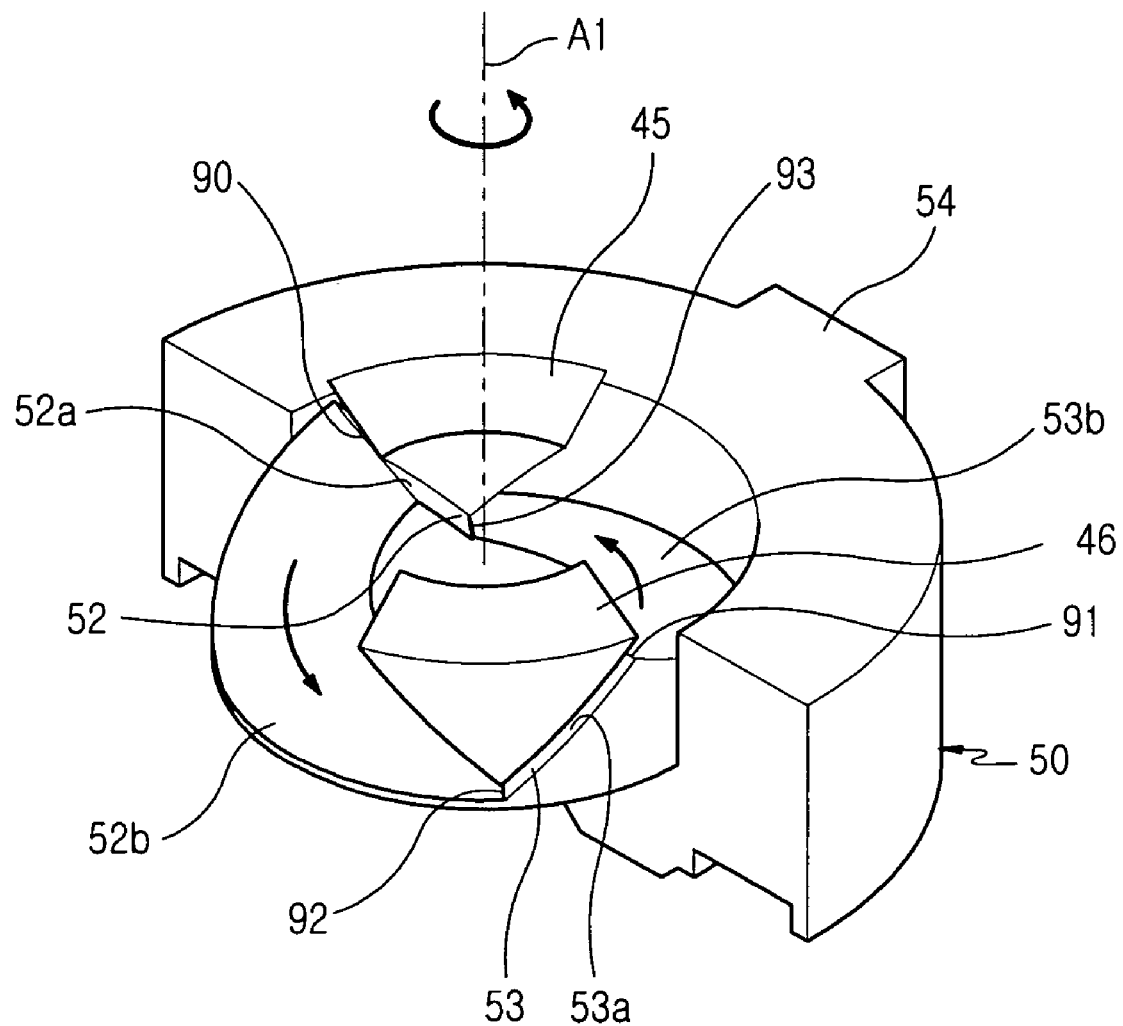
FIG. 10 shows the operation of a hinge shaft and a hinge cam of a swing hinge device of a portable terminal, wherein first and second crests of the hinge shaft engage with first and second troughs of the hinge cam, according to an embodiment of the present invention.

The first and second troughs 52 and 53 have first and second slant surfaces 52a and 53a formed on a surface thereof, respectively, to move the first and second crests 45 and 46 upward with a slant, as shown in FIG. 10.

The first and second troughs 52 and 53 have third and fourth slant surfaces 52b and 53b formed on the other surface thereof, respectively, so that the first and second crests 45 and 46 can smoothly slide downward after climbing the first and second slant surfaces 52a and 53a.

The first and second slant surfaces 52a and 53a have first and second curvature points 90 and 91 positioned at the top thereof, respectively, with about a 40° upward slant.

The third and fourth slant surfaces 52b and 53b have third and fourth curvature points 92 and 93 positioned at the bottom thereof, respectively, which the first and second crests 45 and 46 reach as they slide downward after climbing the first and second curvature points 90 and 91.

The hinge stopper portion 70 includes a stopper groove 71 and a stopper protrusion 72.

The stopper groove 71 is formed on each fastening piece of the hinge housing 30 to guide the stopper protrusion 72 formed on the hinge shaft 40 and to stop rotation.

The stopper protrusion 72 is formed on the hinge shaft 40 for rotational movement along the stopper groove 71.

The stopper groove 71 has first and second contact surfaces 71a and 71b formed on both ends thereof for contact with the stopper protrusion 72.

The operation of the swing hinge device of a portable terminal, configured as above, according to a preferred embodiment of the present invention will be now described in more detail with reference to FIGS. 1 to 13.

As shown in FIGS. 1 and 2, the swing hinge device of a portable terminal includes a hinge housing 30, a hinge shaft 40, a hinge cam 50, a hinge spring 60, and a hinge stopper portion 70.

Figure 3:
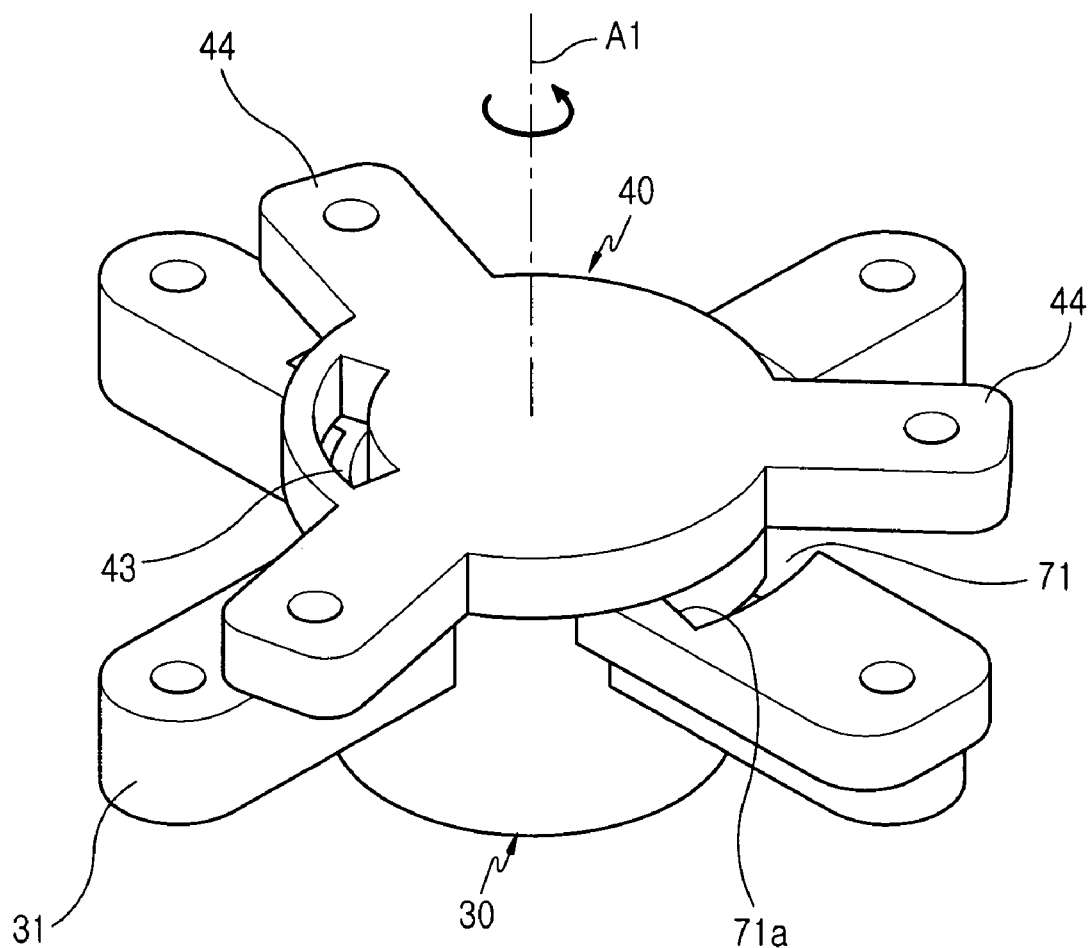
FIG. 3 is an assembled perspective view of a swing hinge device of a portable terminal according to an embodiment of the present invention.

As shown in FIGS. 2 and 3, the first and second troughs 52 and 53 are formed inside the reception space formed in the hinge housing 30 and face the first and second crests 45 and 46. The hinge cam 50 is positioned in the reception space in such a manner that it may linearly travel along the longitudinal direction of the hinge axis A1 of the hinge housing 30.

The hinge spring 60 is positioned between the hinge housing 30 and the hinge cam 50 to provide an elastic force necessary for the linear movement of the hinge cam 50 while forcing it against the hinge shaft 40.

Figure 4:
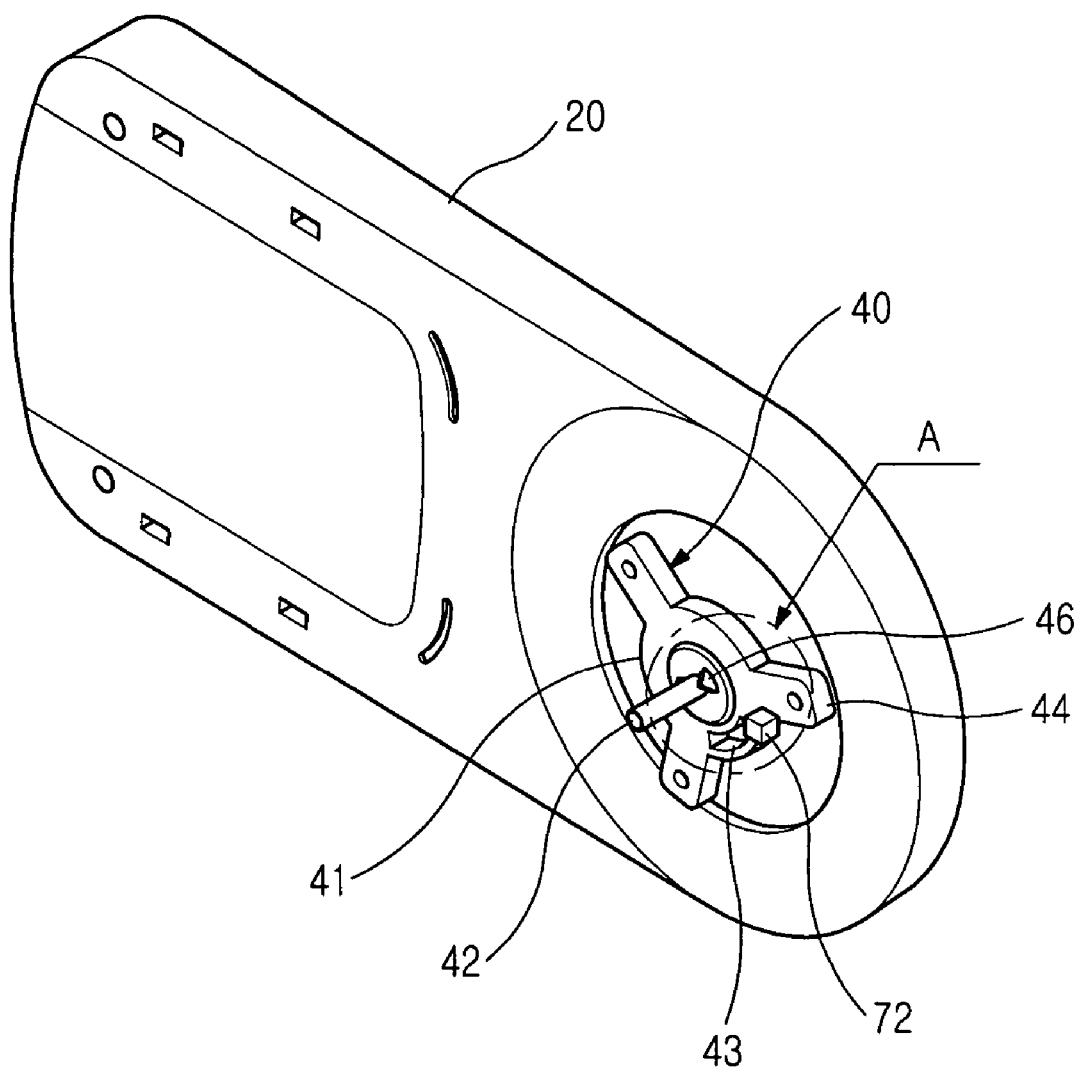
FIG. 4 is a perspective view of a hinge shaft of a swing hinge device of a portable terminal according to an embodiment of the present invention.
Figure 5:
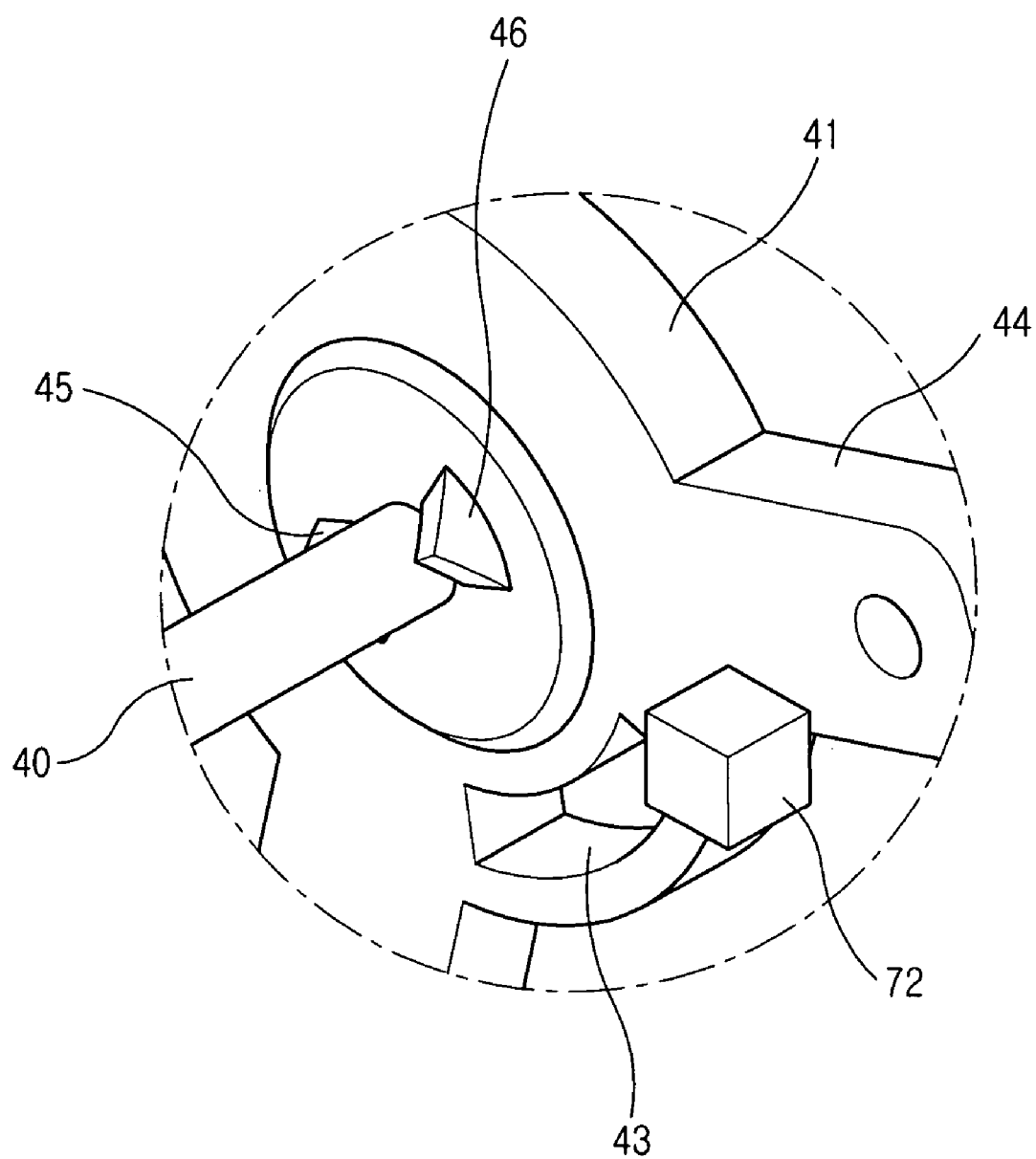
FIG. 5 is a perspective view enlarging area A of FIG. 4.

As shown in FIGS. 4 and 5, the hinge shaft 40 extends through and is coupled to the cam-side through-holes 51 and 43 formed in the hinge cam 50 with an end thereof coupled to the screw coupling portion 34 formed on the inner central portion of the hinge housing 30.

The housing-side screw hole 34a formed on the screw coupling portion 34 is brought into coincidence with the shaft-side screw groove 42 formed on the hinge shaft 40 so that the screw 80 may be fastened to the hole while allowing the hinge shaft 40 to rotate.

The first and second crests 45 and 46 are coupled to the first and second troughs 52 and 53 formed on the hinge cam 50 while facing one another.

As shown in FIGS. 1 and 2, a number of housing-side fastening pieces 31 extend from the outer circumference of the hinge housing 30 to be screw-fastened to the first housing 10. The housing-side fastening pieces 31 are inserted into a number of insertion grooves 13 formed on the first housing 10 and fixedly screw-fastened to the first housing 10.

The housing-side fastening pieces 31 are positioned with substantially equal angular spacing about the hinge axis A1 of the hinge housing 30, such as in a cross configuration.

As shown in FIG. 4, the hinge shaft 40 is provided with a disk-shaped plate 41, which has a number of shaft-side fastening pieces 44 extending from the outer circumference thereof to be screw-fastened to the second housing 20. The hinge shaft 40 is screw-fastened to the second housing 20 by the shaft-side fastening pieces 44.

The shaft-side fastening pieces 44 are arranged about the hinge axis A1 of the hinge shaft 40 with substantially equal angular spacing therebetween, thereby forming obtuse—angles resulting in a triangular configuration.

Figure 14:
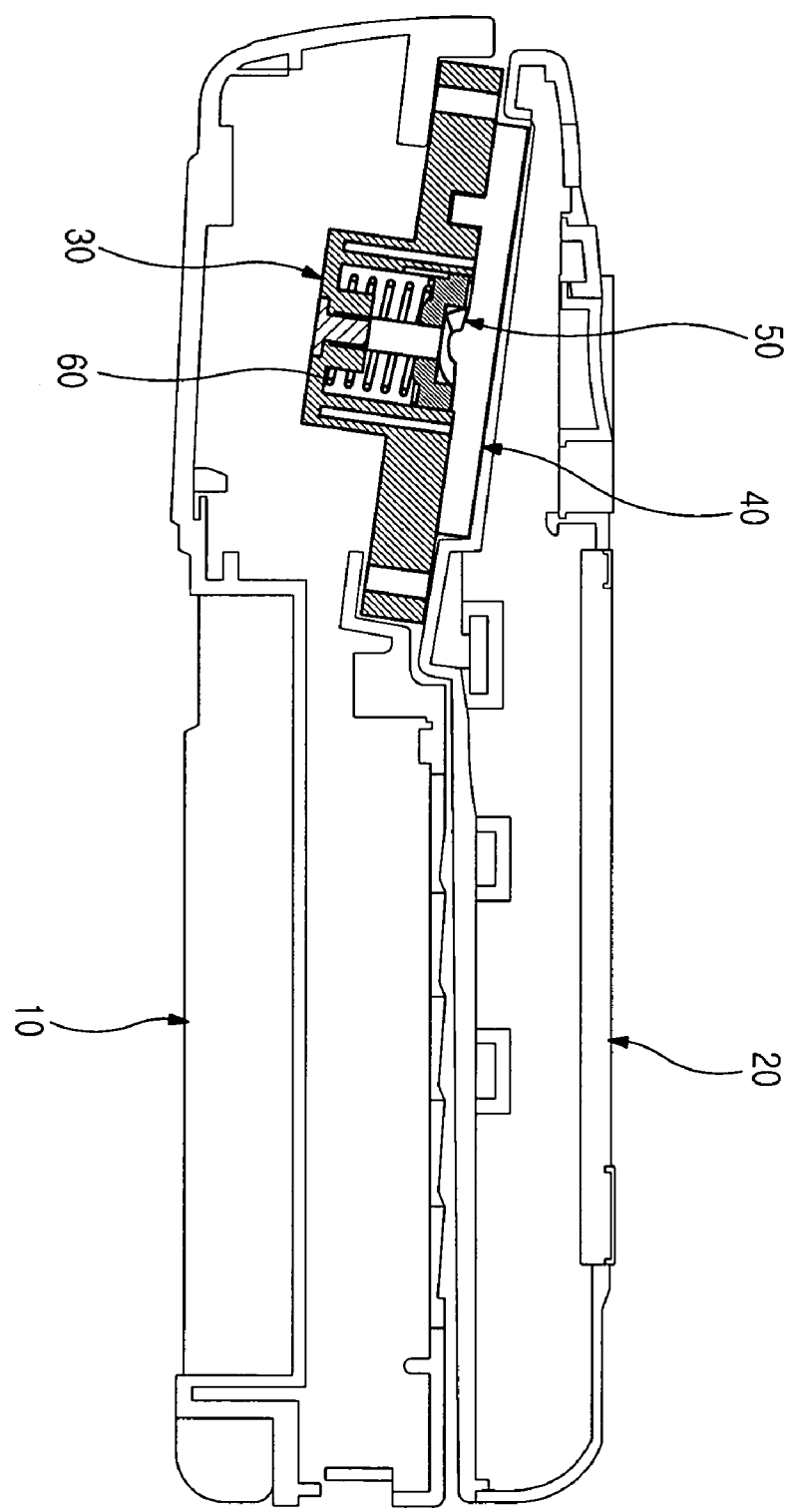
FIG. 14 is a side elevational view in partial cross section of a swing hinge device of a portable terminal that is coupled to first and second housings according to an embodiment of the present invention.

As shown in FIG. 14, the first and second housings 10 and 20 are coupled to each other while facing each other, and the hinge housing 30 and the hinge shaft 40 are fastened to the first and second housings 10 and 20 while being slanted with a predetermined angle relative thereto.

Figure 6:
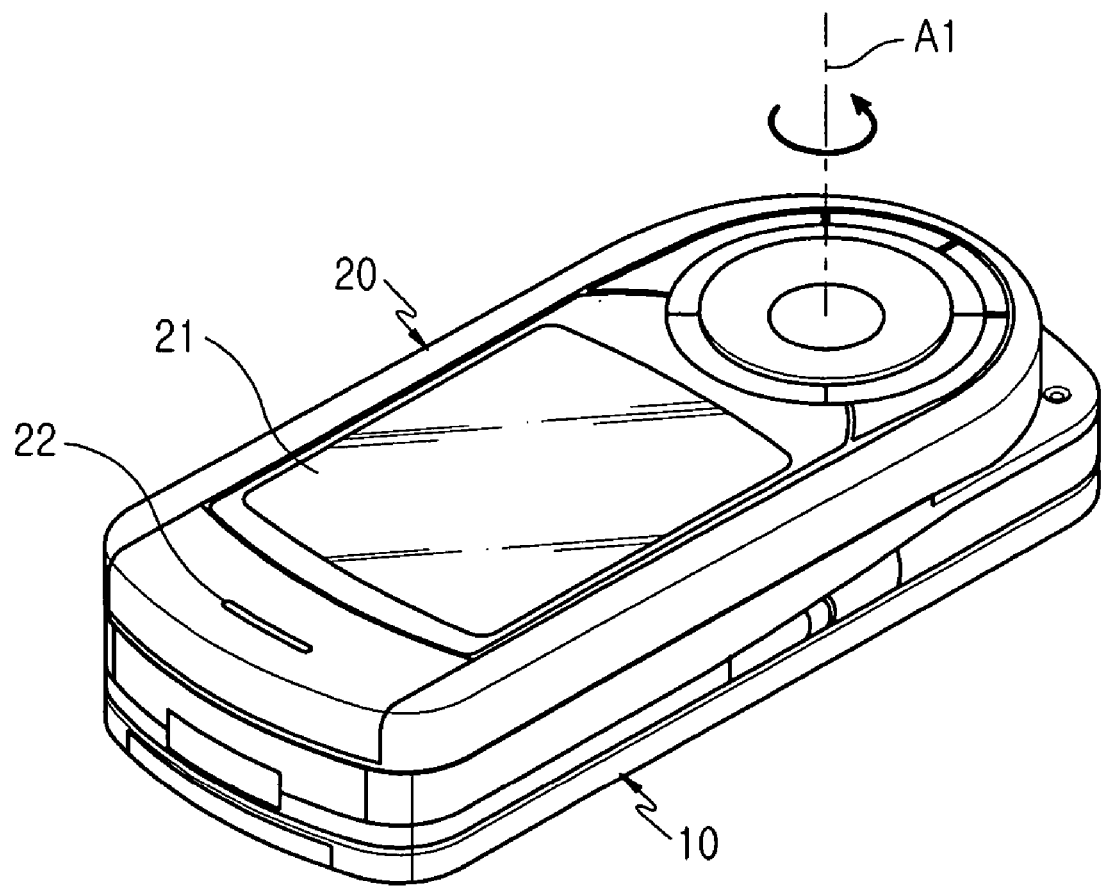
FIG. 6 is a perspective view of a swing hinge device of a portable terminal before its second housing is rotated according to an embodiment of the present invention.
Figure 8:
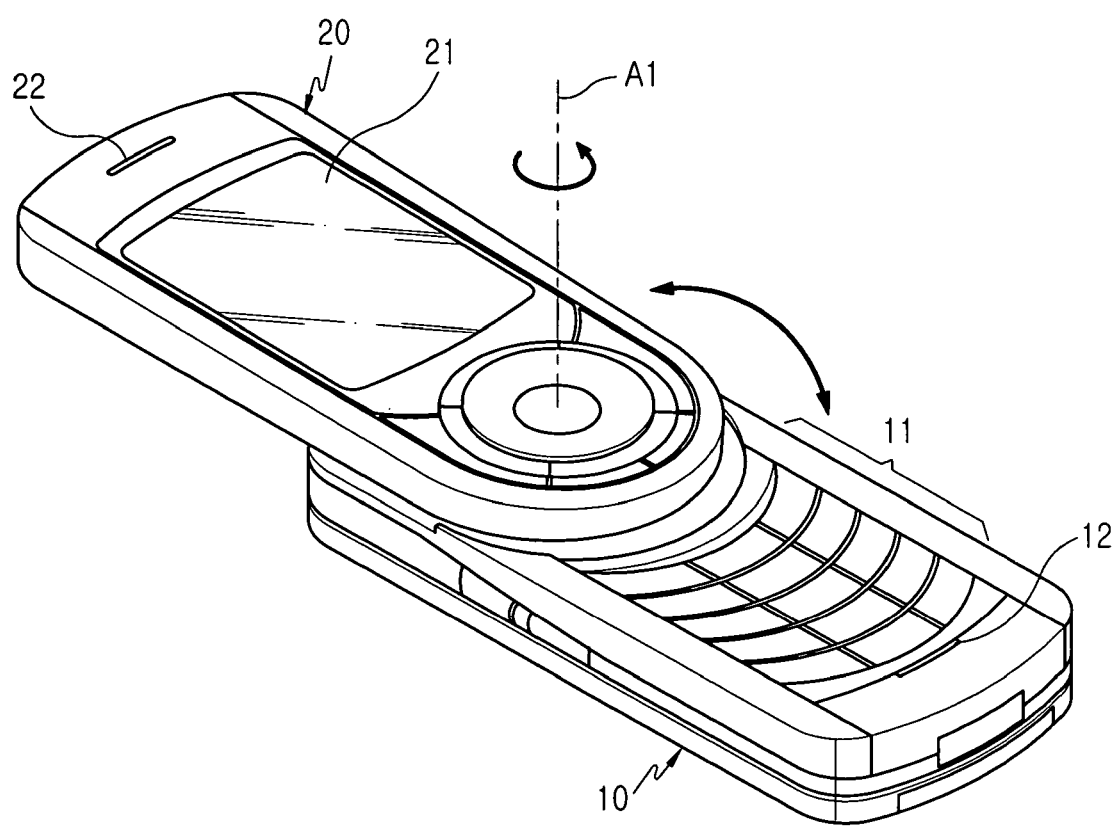
FIG. 8 is a perspective view of a swing hinge device of a portable terminal after its second housing is rotated 180° according to an embodiment of the present invention.

As shown in FIGS. 6 and 8, the second housing 20 is rotated about the vertical hinge axis A1 of the first housing 10.

Figure 7:
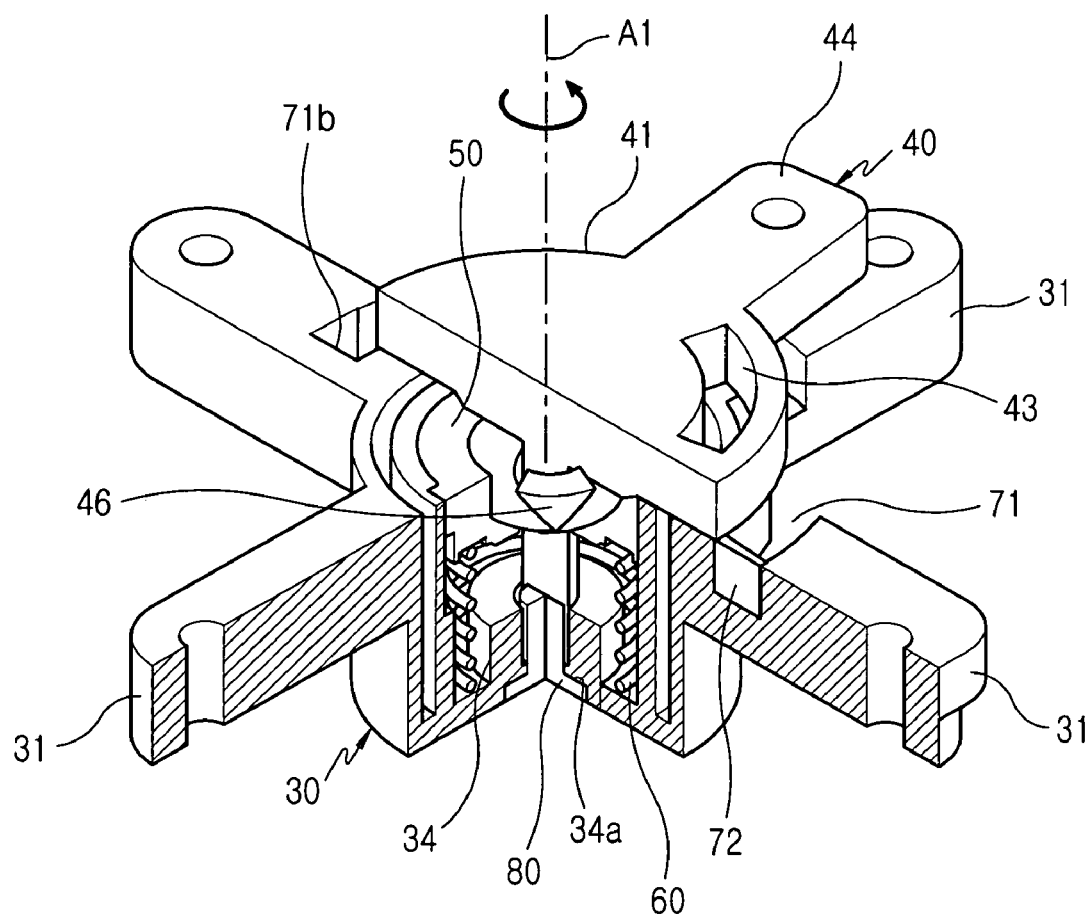
FIG. 7 is a partially-broken magnified perspective view of the swing hinge device of a portable terminal shown in FIG. 6.
Figure 9:
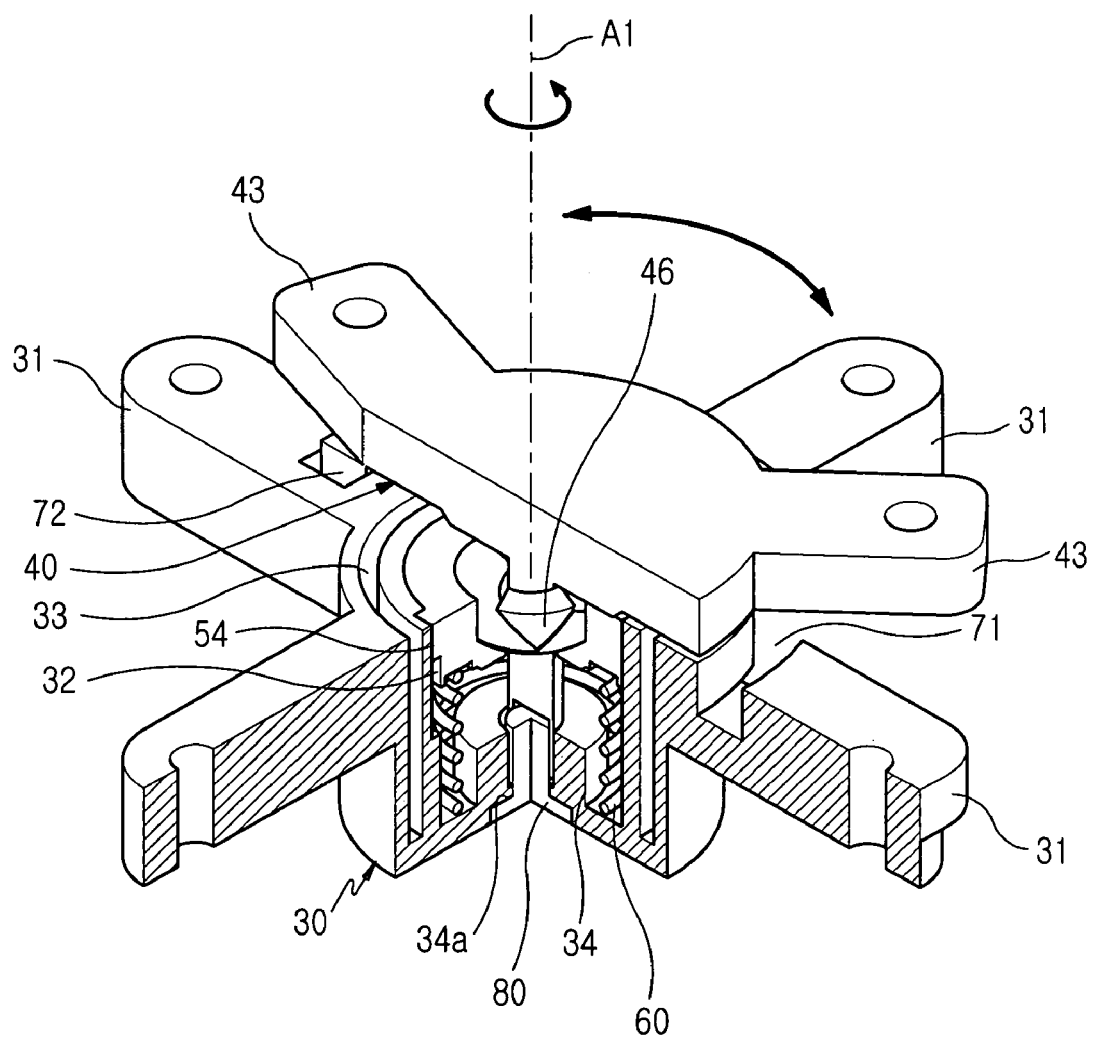
FIG. 9 is a partially-broken magnified perspective view of the swing hinge device of a portable terminal shown in FIG. 8.

As shown in FIGS. 7 and 9, the hinge shaft 40 is rotated together with the second housing 20 and the first crest 45, which is formed on the hinge shaft 40, simultaneously travels along the first slant surface 52a of the first trough 52.

Figure 11:
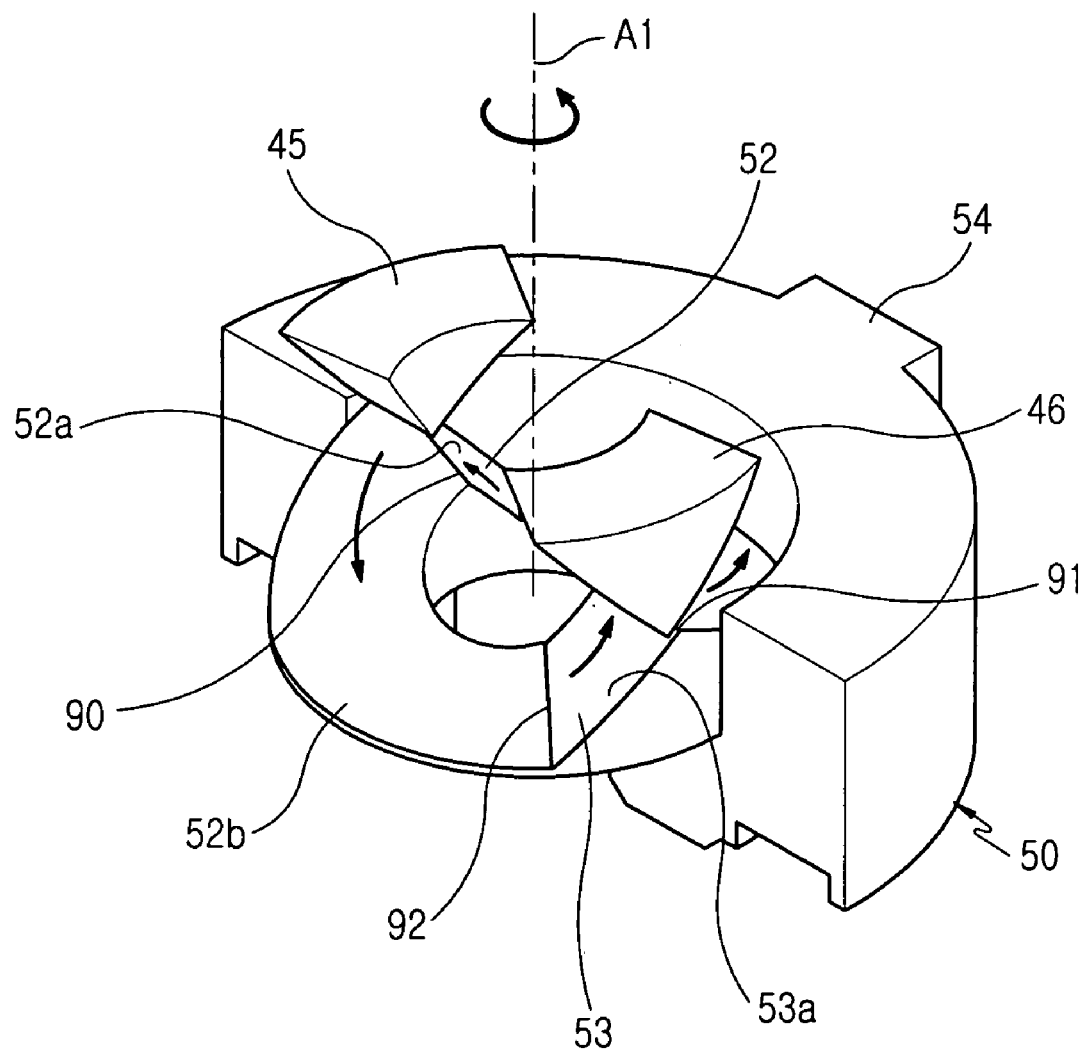
FIG. 11 shows the operation of a hinge shaft and a hinge cam of a swing hinge device of a portable terminal, wherein first and second crests of the hinge shaft rotate and climb the 40° slant surface of first and second troughs of the hinge cam, according to an embodiment of the present invention.

As shown in FIGS. 10 and 11, the first slant surface 52a has a first curvature point 90 positioned at the top thereof with a 40° upward slant. The first crest 45 travels upward along the first slant surface 52a and reaches the first curvature point 90.

Figure 12:
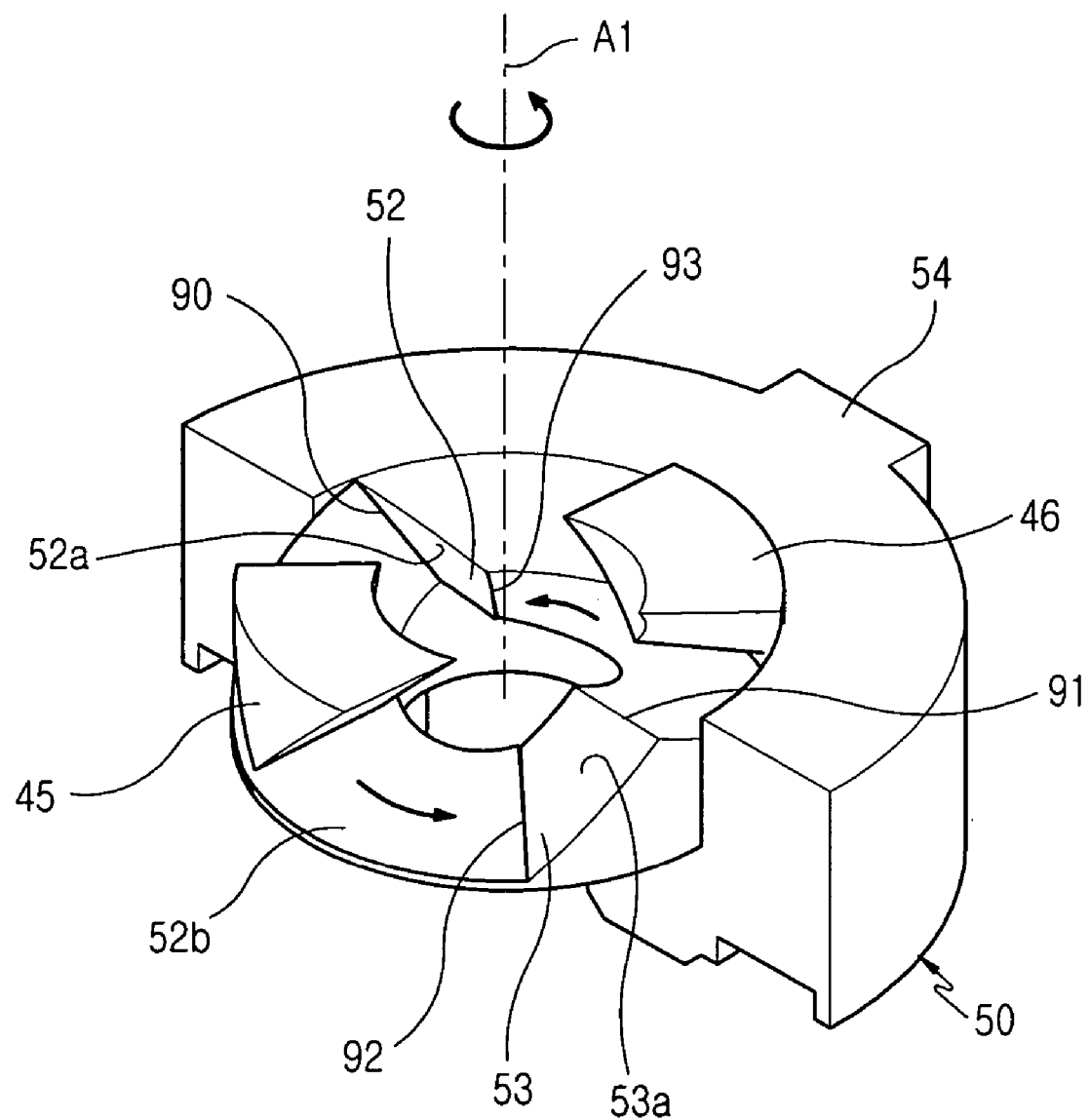
FIG. 12 shows the operation of a hinge shaft and a hinge cam of a swing hinge device of a portable terminal, wherein first and second crests of the hinge shaft rotate and slide by means of the hinge cam, according to an embodiment of the present invention.
Figure 13:
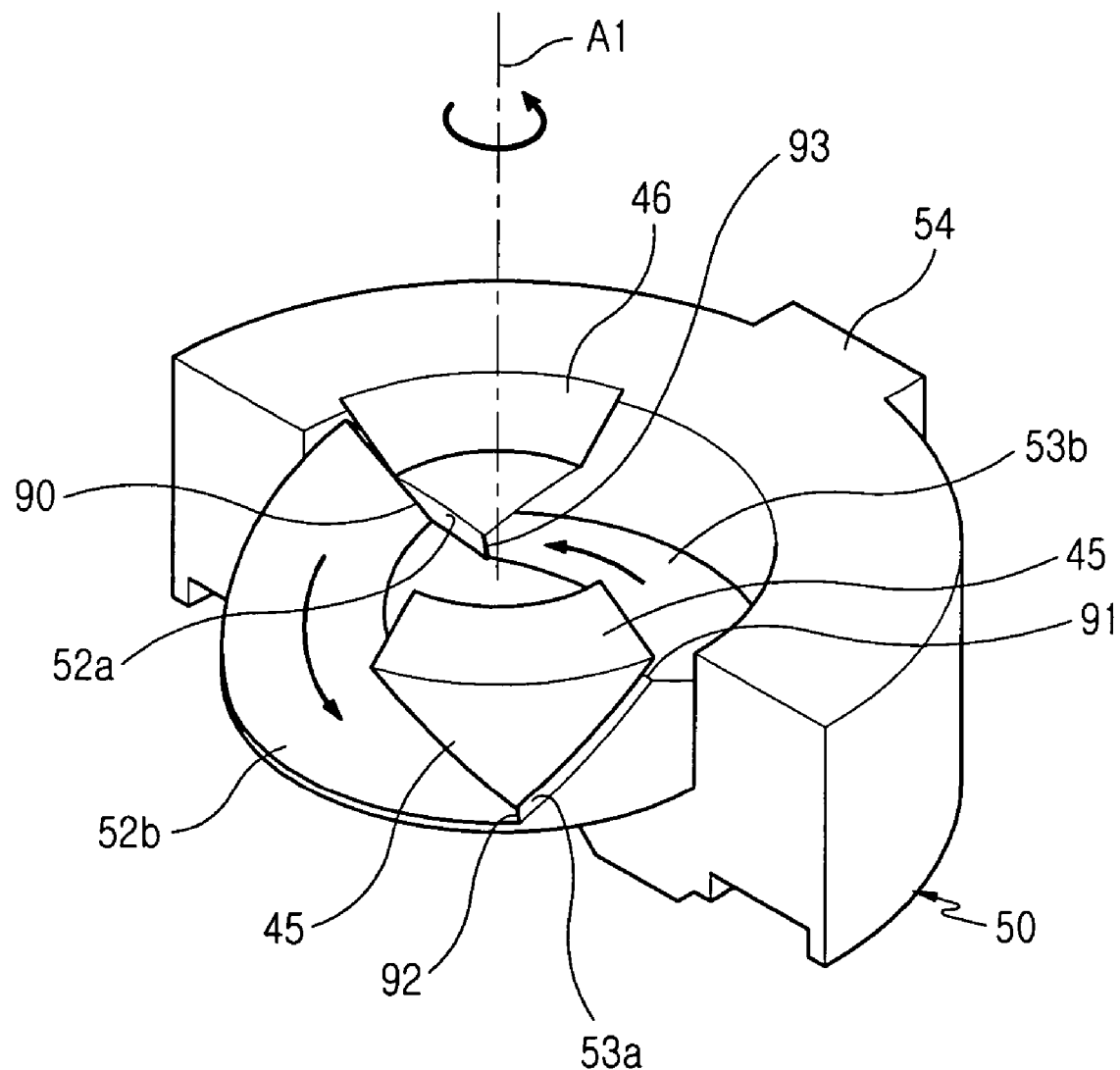
FIG. 13 shows the operation of a hinge shaft and a hinge cam of a swing hinge device of a portable terminal, wherein first and second crests of the hinge shaft rotate and slide by means of the hinge cam and again contact first and second troughs of the hinge cam, according to an embodiment of the present invention.

As shown in FIGS. 12 and 13, after reaching and passing through the first curvature point 90, the first crest 45 slides along the third slant surface 52b and reaches the third curvature point 92, which is the bottom point.

The third slant surface 52b is a gently slanted surface and guides the downward sliding of the first crest 45.

The second crest 46, which faces the first crest 45 of the hinge shaft 40 with symmetry, simultaneously travels along the second slant surface 53a of the second trough 53.

As shown in FIGS. 12 and 13, the second slant surface 53a has a second curvature point 91 positioned at the top thereof with a 40° upward slant. The second crest 46 travels upward along the second slant surface 53a and reaches the second curvature point 91. After passing through the second curvature point 91, the second crest 46 slides along the fourth slant surface 53b and reaches the fourth curvature point 93, which is the bottom point.

The fourth slant surface 53b is a gently slanted surface and guides the downward sliding of the second crest 46.

As shown in FIG. 8, the second housing 20 semi-automatically rotates substantially 180° from the first housing 10 to be open.

As shown in FIGS. 7 and 9, the stopper groove 71 is formed on three of the four housing-side fastening piece 31 of the hinge housing 30 to guide the stopper protrusion 72 formed on the hinge shaft 40 and to stop rotation. When the stopper protrusion 72 rotates, it engages with the stopper groove 71 and stops rotating.

The stopper groove 71 has first and second contact surfaces 71a and 71b formed on both ends thereof for contact with the stopper protrusion 72. Contact surfaces 71a and 71b are formed on diametrically opposed housing-side fastening pieces 31, as shown in FIG. 2. The stopper groove 71 passes completely through the housing-side fastening piece positioned between the contact surfaces 71a and 71b. The stopper protrusion 72 contacts the first contact surface 71a and limits the range of rotation of the second housing 20 to approximately 180°.

If the second housing 20 is rotated in the opposite direction to return it to original position, the first and second crests 45 and 46 slide along the slant surfaces 52a, 53a, 52b, and 53b formed on the first and second troughs 52 and 53, respectively, in the opposite direction and return to the original position in a semi-automatic manner.

As the stopper protrusion 72 contacts the second contact surface 71b formed on an end of the stopper groove 71, the second housing 20 rotates 180° and returns to original position.

As shown in FIGS. 10 and 13, the first and second crests 45 and 46 of the hinge shaft 40 reach the first and second curvature points 90 and 91 with a 40° upward slant on the hinge cam 50. After passing through the curvature points, they slide downward until 180° line and reach the third and fourth curvature points 92 and 93. The first and second crests 45 and 46 then rotate in the opposite direction and again reach the first and second curvature points 90 and 91 with a 40° upward slant. After passing through the curvature points again, they slide downward until 360° line and reach the third and fourth curvature points 92 and 93. This completes a rotation cycle.

As mentioned above, the present invention provides a swing hinge device of a portable terminal adapted to semi-automatically rotate a pair of housings of the terminal in a rotation cycle, while they face each other, for easy opening and closing operation of the terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A swing hinge device of a portable terminal having a first housing and a second housing rotatably coupled to the first housing about a hinge axis, the swing hinge device comprising:

a hinge housing extending along a longitudinal direction and having a reception space formed therein and a plurality of housing-side fastening pieces;

a hinge shaft rotatably coupled to the hinge housing and having a plurality of crests formed thereon;

a hinge cam positioned in the reception space of the hinge housing to linearly travel therein along the longitudinal direction of the hinge housing and having a number of troughs formed thereon that face the respective crests;

a hinge spring positioned between the hinge housing and the hinge cam to provide an elastic force so that the hinge cam is adapted to linearly travel while forcing it against the hinge shaft;

a stopper protrusion formed on the hinge shaft; and a stopper groove formed in each housing-side fastening piece of the hinge housing to guide and stop rotational movement of the stopper protrusion along the stopper groove.

2. A swing hinge device of a portable terminal as claimed in claim 1, wherein the hinge housing and the hinge shaft are slanted a predetermined angle relative to the first and second housings.

3. A swing hinge device of a portable terminal as claimed in claim 1, wherein the housing-side fastening pieces extend from the outer circumference of the hinge housing to be screw-fastened to the first housing;

a pair of guide grooves formed on the inner wall surface of the hinge housing adapted to be coupled to a guide protrusion formed on the hinge cam for guidance;

a circuit connection groove formed between the housing-side fastening pieces and the guide groove adapted to receive a flexible circuit therethrough; and a screw coupling portion formed on the inner central portion of the hinge housing and having a screw hole formed therein to be coupled and screw-fastened to an end of the hinge shaft.

4. A swing hinge device of a portable terminal as claimed in claim 3, wherein each housing-side fastening piece is positioned with substantially equal angular spacing therebetween about the hinge axis of the hinge housing.

5. A swing hinge device of a portable terminal as claimed in claim 4, wherein the housing-side fastening pieces form a cross configuration.

6. A swing hinge device of a portable terminal as claimed in claim 1, wherein the hinge shaft has a disk-shaped plate positioned on an end thereof and a shaft-side screw groove formed in the other end thereof, the disk-shaped plate has a through-hole formed therein adapted to receive a flexible circuit therethrough and a number of shaft-side fastening pieces extend from the outer circumference thereof to be screw-fastened to the second housing, and the hinge shaft plurality of crests including first and second crests formed on the outer peripheral surface thereof adjacently to each other, which are positioned along the circumference thereof and adapted to rotate while facing the respective troughs formed on the hinge cam.

7. A swing hinge device of a portable terminal as claimed in claim 6, wherein the shaft-side fastening pieces are arranged with an obtuse angle formed between each shaft-side fastening piece about the hinge axis of the hinge shaft.

8. A swing hinge device of a portable terminal as claimed in claim 7, wherein
each of the obtuse angles is substantially equal.

9. A swing hinge device of a portable terminal as claimed in claim 7, wherein
the shaft-side fastening pieces form a triangular configuration.

10. A swing hinge device of a portable terminal as claimed in claim 6, wherein
the first and second crests and symmetrically positioned about the hinge axis of the hinge housing while facing each other.

11. A swing hinge device of a portable terminal as claimed in claim 1, wherein
a cam-side through-hole positioned at the central portion of the hinge cam adapted to receive the hinge shaft therethrough;
the number of trough including first and second troughs positioned along the outer periphery of the cam-side through-hole in such a manner that they face the plurality of crests including first and second crests and semi-automatically rotate the hinge shaft according to a direction of rotation; and
a guide protrusion extends from the outer peripheral surface of the hinge cam to guide the hinge cam to travel linearly toward the hinge shaft when coupled to the guide groove of the hinge housing.

12. A swing hinge device of a portable terminal as claimed in claim 11, wherein
the first and second troughs are formed having a predetermined depth and have first and second slant surfaces formed on a surface thereof, respectively, adapted to move the first and second crests upwardly and third and fourth slant surfaces formed on the other surface thereof respectively, so that the first and second crests smoothly slide downwardly after climbing the first and second slant surfaces.

13. A swing hinge device of a portable terminal as claimed in claim 12, wherein
the first and second slant surfaces have first and second curvature points positioned at the top thereof, and the third and fourth slant surfaces have third and fourth curvature points positioned at the bottom thereof, respectively, which the first and second crests reach as they slide downwardly after climbing the first and second curvature points.

14. A swing hinge device of a portable terminal as claimed in claim 13, wherein
the first and second slant surfaces have an angle of approximately 40°.

15. A swing hinge device of a portable terminal as claimed in claim 1, wherein
the stopper groove has first and second contact surfaces formed on both ends thereof for contact with the stopper protrusion.

16. A swing hinge device of a portable terminal as claimed in claim 15, wherein
the first and second contact surfaces are formed on diametrically opposed housing-side fastening pieces.

17. A swing hinge device of a portable terminal as claimed in claim 1, wherein
a first end of the stopper groove is formed in a first housing-side fastening piece;
a second end of the stopper groove is formed in a second housing-side fastening piece; and
the stopper groove passes through each housing-side fastening piece positioned between the first and second housing-side fastening pieces.

18. A swing hinge device of a portable terminal as claimed in claim 17, wherein
the first and second housing-side fastening pieces are diametrically opposed.

19. A swing hinge device of a portable terminal as claimed in claim 17, wherein
the stopper protrusion connected to the hinge shaft is adapted to be received in the stopper groove, thereby limiting the rotation of the stopper protrusion to approximately 180°.

* * * * *